(12) United States Patent
Raykar et al.

(10) Patent No.: US 10,586,263 B2
(45) Date of Patent: Mar. 10, 2020

(54) TOUCH AND PRESSURE-BASED APPAREL IMAGE SEARCHING

(71) Applicant: International Business Machines Corporation, Yorktown Heights, NY (US)

(72) Inventors: Vikas Raykar, Bangalore (IN); Amrita Saha, Bangalore (IN); Raghavendra Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 15/361,613

(22) Filed: Nov. 28, 2016

(65) Prior Publication Data
US 2018/0150891 A1    May 31, 2018

(51) Int. Cl.
G06Q 30/00    (2012.01)
G06Q 30/06    (2012.01)
(Continued)

(52) U.S. Cl.
CPC ..... G06Q 30/0623 (2013.01); G06F 16/5866 (2019.01); G06Q 30/0603 (2013.01); G06Q 50/01 (2013.01); G06F 16/951 (2019.01)

(58) Field of Classification Search
CPC .... G06F 3/0488; G06F 3/04847; G06Q 20/12
(Continued)

(56) References Cited

U.S. PATENT DOCUMENTS 7,702,681 B2    4/2010    Brewer et al.
8,068,676 B2    11/2011   Zhang et al.
(Continued)

FOREIGN PATENT DOCUMENTS

| CN | 103729777 A   | 4/2014  |
|----|---------------|---------|
| EP | 2876604 A1    | 11/2014 |
| WO | 2013184073 A1 | 12/2013 |

OTHER PUBLICATIONS

Anonymous, "The emergence of vending and the generation M shopper," (2011) Packaging Strategies, 29(21), 5(1) (Year: 2011).*

(Continued)

*Primary Examiner* — Brandy A Zukanovich
(74) *Attorney, Agent, or Firm* — Ryan, Mason & Lewis, LLP

(57) ABSTRACT

Methods, systems, and computer program products for pressure-based apparel image searching are provided herein. A computer-implemented method includes determining an object of interest within an image displayed on a screen by detecting physical contact imparted by a user at a particular position on the screen corresponding to where the first object is located; quantifying the amount of pressure applied by the user via the physical contact; determining additional objects of interest based on the amount of pressure applied by the user by identifying objects that are located within a specified distance from the first object, and wherein the specified distance corresponds to the amount of pressure applied by the user; retrieving, from at least one electronic commerce website, images of products corresponding to the first object of interest and images of products corresponding to each of the additional objects of interest; and displaying the retrieved images on the screen.

17 Claims, 6 Drawing Sheets

(51) Int. Cl.
*G06Q 50/00* (2012.01)
*G06F 16/58* (2019.01)
*G06F 16/951* (2019.01)

(58) Field of Classification Search
USPC .............................................. 705/26.1, 27.1
See application file for complete search history.

(56) References Cited

U.S. PATENT DOCUMENTS

| | | | |
|---|---|---|---|
| 8,682,739 B1* | 3/2014 | Feinstein | G06Q 30/06 705/26.1 |
| 9,201,900 B2 | 12/2015 | Tai | |
| 2006/0012677 A1 | 1/2006 | Neven, Sr. et al. | |
| 2013/0212477 A1* | 8/2013 | Averbuch | H04N 21/4725 715/719 |
| 2015/0006325 A1 | 1/2015 | Zhao | |
| 2015/0134688 A1 | 5/2015 | Jing et al. | |
| 2016/0335692 A1* | 11/2016 | Yamartino | G06Q 30/0625 |
| 2018/0275850 A1* | 9/2018 | Seol | G06F 3/044 |

OTHER PUBLICATIONS

Wikipedia, Convolutional neural network, https://en.wikipedia.org/w/index.php?title=Convolutional_neural_network&oldid=749943766, Nov. 17, 2016.
Wikipedia, Google Goggles, , https://en.wikipedia.org/w/index.php?title=Google_Goggles&oldid=747126826, Oct. 31, 2016.
Welch, C., Amazon's Flow uses your iPhone's camera to make a shopping list, The Verge, Feb. 7, 2014.
Jing et al., "Visual Search at Pinterest." KDD 2015.
Datta et al. "Image retrieval: Ideas, influences, and trends of the new age." ACM Computing Surveys (CSUR) 40.2 (2008).
Liu et al. "Street-to-shop: Cross-scenario clothing retrieval via parts alignment and auxiliary set." Computer Vision and Pattern Recognition (CVPR), 2012 IEEE Conference on. IEEE, 2012.

* cited by examiner

TOUCH AND PRESSURE-BASED APPAREL IMAGE SEARCHING

FIELD

The present application generally relates to information technology, and, more particularly, to image searching technologies.

BACKGROUND

Fashion is a multi-billion dollar industry with social and economic implications worldwide. Commonly, people may wish to buy clothes that they see in images, photographs, advertisements, social media posts, smart phone applications (apps), etc. However, such people may have difficulty describing the images via text and searching for a similar look on various websites using such textual descriptions.

SUMMARY

In one embodiment of the present invention, techniques for touch and pressure-based apparel image searching are provided. An exemplary computer-implemented method can include determining a first object of interest within an image displayed on a screen, wherein determining the first object of interest comprises detecting physical contact imparted by a user at a particular position on the screen corresponding to where the first object of interest is located. Such a method can also include quantifying the amount of pressure applied by the user via the physical contact, and determining one or more additional objects of interest within the image based on the amount of pressure applied by the user via the physical contact, wherein determining the additional objects of interest comprises identifying one or more objects that are located within a specified distance from the first object of interest in the image, and wherein the specified distance corresponds to the amount of pressure applied by the user via the physical contact. Further, such a method can include retrieving, from at least one electronic commerce website, (i) one or more images of one or more products corresponding to the first object of interest and (ii) one or more images of one or more products corresponding to each of the one or more additional objects of interest, and displaying the retrieved images on the screen.

In another embodiment of the invention, an exemplary computer-implemented method can include converting each of multiple images present in a product catalog of an electronic commerce website to a predetermined representation, and storing the converted images in an index. Additionally, such a method can include determining a first object of interest within an image (i) derived from a social media post and (ii) displayed on a screen, wherein determining the first object of interest comprises detecting physical contact imparted by a user at a particular position on the screen corresponding to where the first object of interest is located. Such a method can also include quantifying the amount of pressure applied by the user via the physical contact, and determining one or more additional objects of interest within the image based on the amount of pressure applied by the user via the physical contact, wherein determining the additional objects of interest comprises identifying one or more objects that are located within a specified distance from the first object of interest in the image, and wherein the specified distance corresponds to the amount of pressure applied by the user via the physical contact. Further, such a method can include retrieving, from the index, (i) one or more images of one or more products corresponding to the first object of interest and (ii) one or more images of one or more products corresponding to each of the one or more additional objects of interest, and displaying the retrieved images on the screen.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes touch and pressure-based fashion image visual searching via attention based nearest neighbors. At least one embodiment of the invention includes automatically fetching products on a website (for example, a clothing seller's website) corresponding to the apparel and/or accessory for which the user is indicating interest via touch gestures on a screen and/or interface. As further detailed herein, one or more embodiments of the invention can include determining a region and/or object of interest within an image, based on pressure imparted by a user on the screen/interface or holding a touched portion of the screen/interface by a user, and retrieving one or more products from a website (or Internet catalogue) that are similar to and/or correspond to the region/object of interest.

Via one or more embodiments of the invention, a user can specify a product of interest within an image by touching a region on the image with his or her finger and/or a mouse or pointer on a screen of a computing device (such as, a smart phone, a mobile device, a tablet, a personal computer, etc.). In such an embodiment, the user does not have to mark and/or segment an entire region of interest. Rather, the user can simply point his or her finger (or mouse) approximately within the product of interest in the image. For example, in response to a user touching any region of a shoe in an image, at least one embodiment of the invention can include fetching similar shoes from a website.

Figure 1:
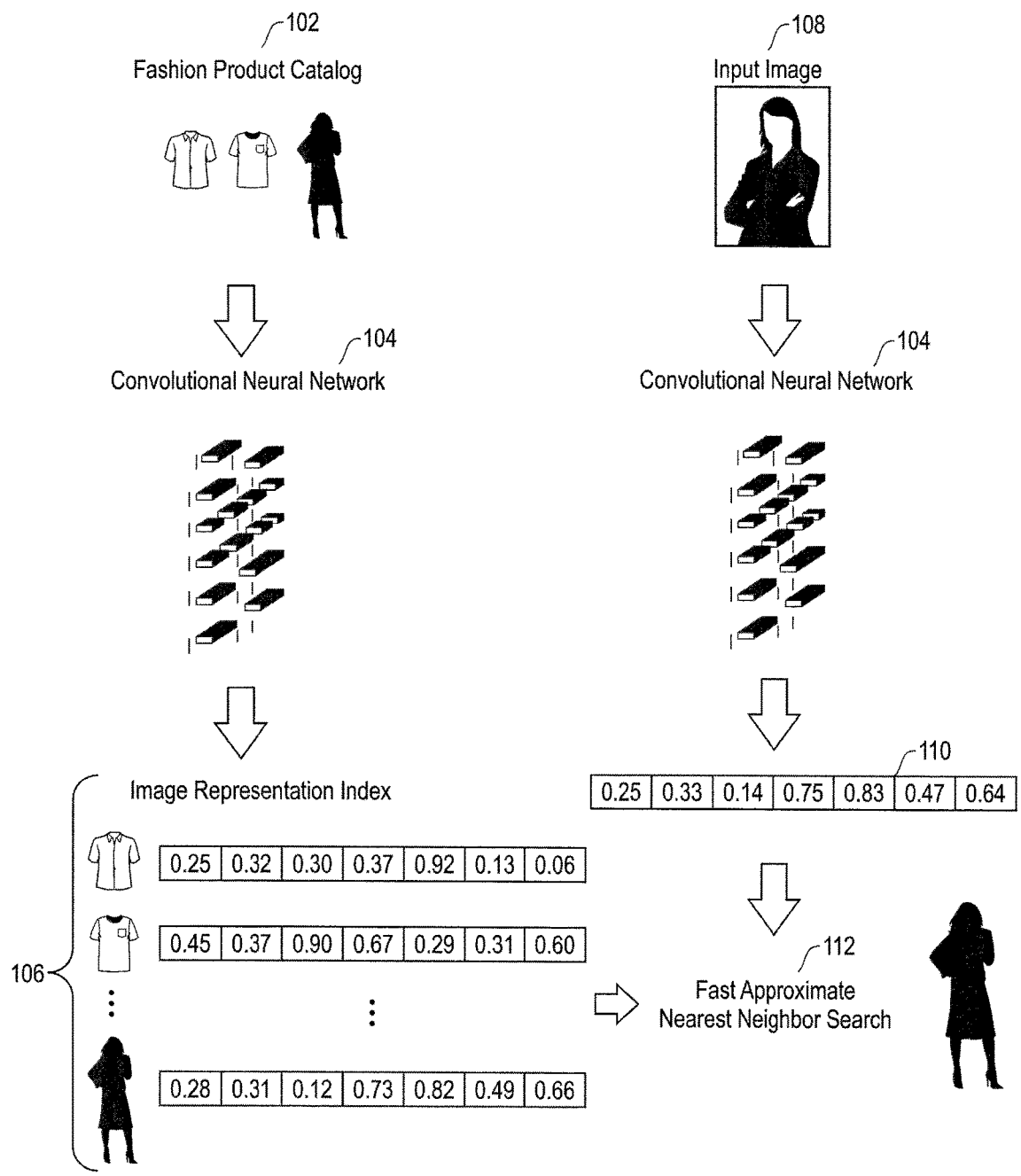
FIG. 1 is a diagram illustrating nearest neighbor searching techniques, according to an embodiment of the invention.

FIG. 1 is a diagram illustrating nearest neighbor searching techniques, according to an embodiment of the invention. By way of illustration, FIG. 1 depicts a convolutional neural network (CoNN) 104 that is trained with a set of fashion images derived from the web and/or one or more fashion product catalogs 102. All images available in the product catalog 102 (for example, of an e-commerce website) are converted to a representation within the CoNN 104 and stored in an index 106. As detailed herein, a CoNN can provide multiple levels of representations for a given image. By way of example, at least one embodiment of the invention can include using the sixth layer (fc6), which is a 4096 dimension vector. Additionally, CoNNs can be trained for object classification tasks as well as image searching. Specifically, given an image (such as an image from the fashion product catalog 102), the CoNN 104 generates a representation for the image which captures one or more items of information embedded in the image. Also, the specific items of information captured by the CoNN are determined by the user.

As also depicted in FIG. 1, given a new/input image 108 (for example, a photo clicked on by a user from a social media post), a fast matching algorithm 112, such as an approximate nearest neighbor search algorithm, can be used to scan the index 106 created in connection with the CoNN 104 and find the closest matching product 110.

With respect to the techniques depicted in FIG. 1, the 4096 dimension vector captures the entire content in the image. As detailed herein, and as illustrated in FIG. 2, one or more embodiments of the invention can include using a CoNN run on the entire image to search for and/or identify specific portions of an input image.

Figure 2:
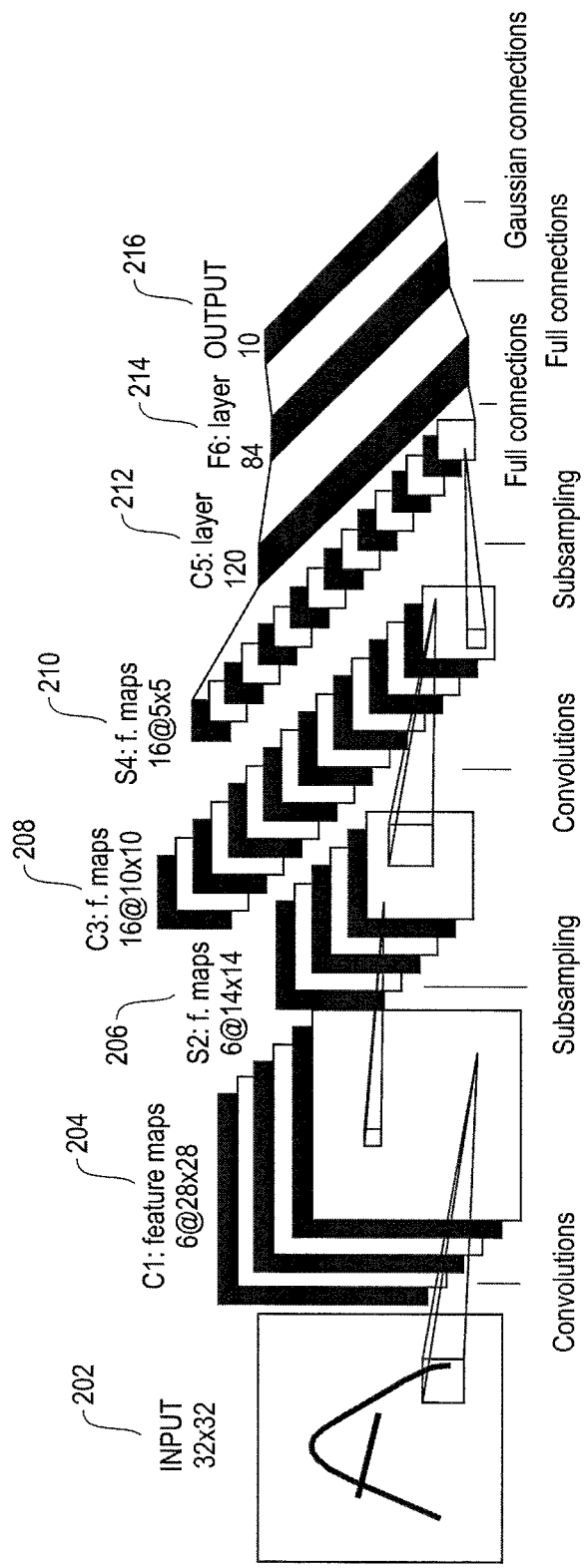
FIG. 2 is a diagram illustrating nearest neighbor searching techniques, according to an embodiment of the invention.

FIG. 2 is a diagram illustrating nearest neighbor searching techniques, according to an embodiment of the invention. By way of illustration, FIG. 2 depicts an input image 202 of size 32×32 (that is, 32 pixels by 32 pixels). One or more convolutions are carried out on at least a portion of the input image 202 to produce six feature maps in a first image layer (C1) 204, with each such feature map comprising a size of 28×28. As used herein, "convolutions" are used to modify the spatial frequency characteristics of an image, and a "feature map" is used to capture the different visual characteristics in an image. Additionally, subsampling (that is, randomly selecting a sub-set) is carried out on all of the feature maps of the first image layer (C1) 204 to generate six feature maps in a second image layer (S2) 206, with each such feature map comprising a size of 14×14.

Further, one or more convolutions are carried out on one or more of the feature maps of the second image layer (S2) 206 to produce sixteen feature maps in a third image layer (C3) 208, with each such feature map comprising a size of 28×28. Subsampling is then carried out on one or more of the feature maps of the third image layer (C3) 208 to generate sixteen feature maps in a fourth image layer (S4) 210, with each such feature map comprising a size of 5×5.

Additionally, a full connection (that is, where every neuron in a given layer in the network is connected to every neuron in the next layer) is carried out on one or more of the feature maps of the fourth image layer (S4) 210 to generate a fifth image layer (C5) 212 (which includes 120 feature maps), and a full connection is carried out on at least a portion of the fifth image layer (C5) 212 to generate a sixth image layer (F6) 214 (which includes 84 feature maps). Based on the sixth image layer (F6) 214, one or more Gaussian connections are determined and implemented to generate an output 216 (which includes ten feature maps).

As depicted in FIG. 2, in response to a user touch and/or user pressure applied to a particular portion of an image (or on a particular garment) via a screen and/or user interface, at least one embodiment of the invention includes utilizing one or more lower layer features of the image. Examples of such features can include color(s) of objects in the image, shape(s) of objects in the image, etc. Such lower layer features are available at different resolutions and are available for different locations in the input image 202. Based on the location of the input image 202 touched by the user, at least one embodiment of the invention can include defining a Gaussian kernel (function) centered on the user's touch (for example, the point at which the user's finger contacted the input image). The feature representations from all locations of the input image are then weighted by this kernel and summed to generate a feature representation for the image for the location of the input image 202 touched by the user. As used herein, such feature representations include learned vector representations which capture different characteristics of an image which are deemed relevant for the end-task, as learned from training data.

Based on the amount pressure applied by the user in contacting a portion of the input image 202, the width of the Gaussian kernel can be increased to retrieve one or more images of varying scales (for example, because the objects of interest in the image can be presented in any arbitrary scale). As such, in accordance with one or more embodiments of the invention, upon a user applying an increased amount pressure on a segment of an input image, such an embodiment includes performing an image search of one or more neighboring segments (for example, one or more adjacent segments to the segment on which the pressure is being applied). Such an imaging search of one or more neighboring segments can result in obtaining and/or generating a bounding box with just one touch of the image from the user (precluding the need, for example, for the user to lift his or her the finger and touch the image one or more additional times). As used herein, a "bounding box" (such as illustrated, for example, by the square in the lower-right corner of the input image 202 in FIG. 2) is a box that is used to indicate any rectangular region of interest in an image.

Based on the use of one or more tactile sensors (commonly present in existing mobile devices, for example), at least one embodiment of the invention can include sensing and/or quantifying the amount of pressure applied by the user via physical contact with the device screen by performing a parametric fitting to a Gaussian distribution. Accordingly, such an embodiment can sense the distribution of the pressure in the region surrounding the point of physical contact. Further, in such an embodiment, the intensity of pressure at every point in the distribution can act as a proxy for the degree of interest of the user. As would be appreciated by one skilled in the art, touch-sensitive displays (within computing devices such as mobile devices) are commonly employed with touch pressure quantification functionality.

Additionally, as further detailed herein, based on the pressure intensity quantified at different regions in the image, at least one embodiment of the invention can include identifying one or more different spatial feature maps of importance. Accordingly, the pressure intensity quantifications can act as weights for combining the feature maps, thus boosting the importance of certain regions in the image.

In accordance with at least one embodiment of the invention, given an image and the finger position of the user on an image (as well as, in one or more embodiments, the amount of pressure applied by the user), such an embodiment includes generating an image representation using, for instance, the techniques described in connection with FIG. 1. Additionally, one or more (for example, all) images available in a product catalog of one or more websites (such as e-commerce apparel websites) are converted to the representation for one or more possible positions, and such converted images are stored in at least one index. With respect to the above-noted "positions," for every product, multiple images from different orientations or positions are available, and the representations of the images are learned from each of these different orientations or positions. Given such a representation for a new (input) image, such an embodiment of the invention can include implementing a fast approximate nearest neighbor algorithm to automatically fetch the products in the catalog(s) corresponding to the apparel and/or accessory within the image that is being touched and/or selected by a user.

As detailed herein, one or more embodiments of the invention include linking an input image being touched by a user (for example, on a social media website) and one or more e-commerce apparel websites that contain one or more product catalogs. In such embodiments, the product catalogs of one or more e-commerce apparel websites are converted to the above-noted representation and indexed prior to implementing the noted techniques of finding e-commerce catalog items that match a user-touched social media post image. Accordingly, one or more embodiments of the invention can include creating a product catalog index, storing that index separately from the actual e-commerce website in question, and subsequently searching a new input image against the stored index (meaning that, in such an embodiment, there is no need to actually transfer the user's web browser to the e-commerce site in question).

Additionally, in connection with screens and/or user interfaces that can sense pressure, at least one embodiment of the invention can produce one or more objects at different scales in response to a user pressing harder (or softer) on a given object within an image. By way merely of example, consider a user viewing an image of a woman wearing a shirt and a skirt, and also holding a handbag. If the user touches on the handbag in the image, one or more embodiments of the invention can include retrieving one or more images of relevant handbag products from at least one (indexed) e-commerce website. Additionally, if the user presses harder (that is, with increased pressure) on the handbag in the image, at least one embodiment of the invention can include retrieving one or more images of relevant skirt products and/or one or more images of relevant shirt products from at least one (indexed) e-commerce website. As noted herein, in one or more embodiments of the invention, the product images are retrieved from a stored index while the image corresponds to a hyperlink to the actual product display page on the e-commerce website (such that the user can quickly make the purchase should he or she desire).

As detailed herein, one or more embodiments of the invention include projecting an area of an image, touched and/or highlighted by a user, to a convolution and/or pool layer below the fully connected layers of the image. As used herein, "projecting" is equivalent to matrix multiplication, whereby the image is also originally represented as a matrix. The user's touch and amount of applied pressure can be used to define a mask (that is, a region of interest) for the fully connected layers, and the masked region can be used for querying. Also, embodiments of the invention are not limited by predefined categories.

Figure 3:
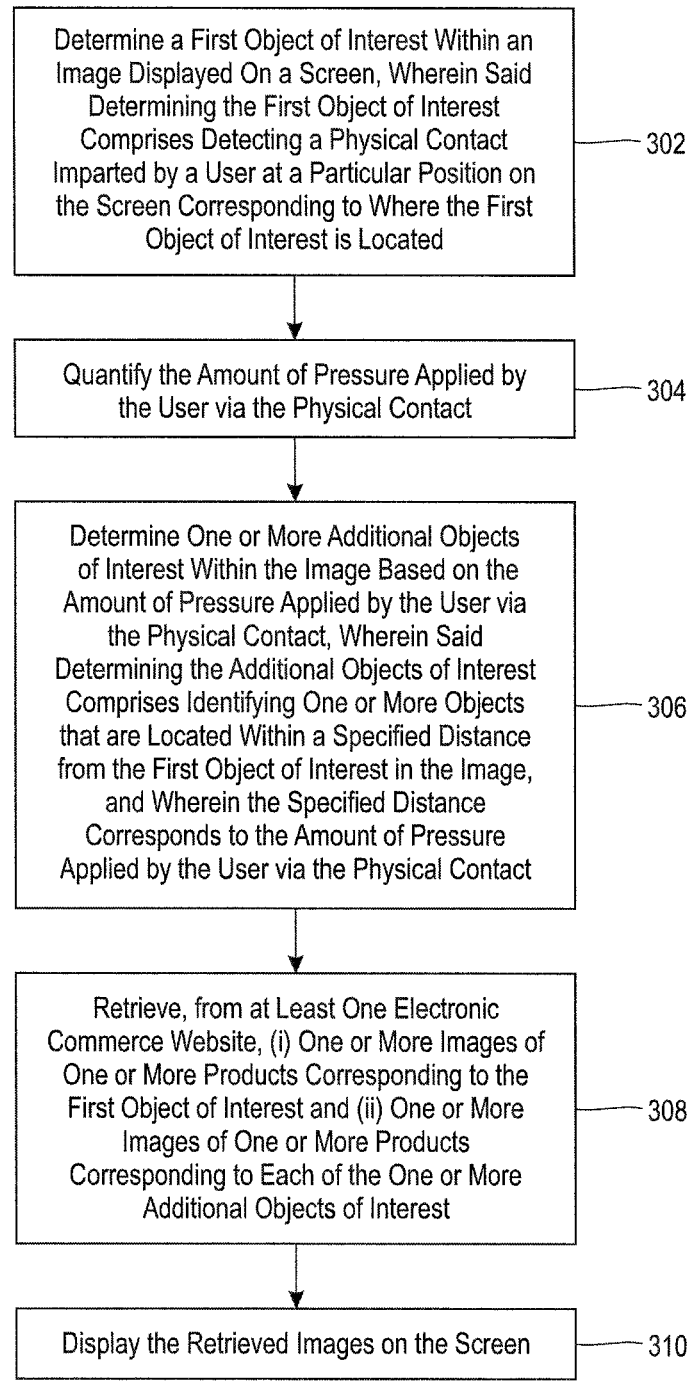
FIG. 3 is a flow diagram illustrating techniques according to an embodiment of the invention.

FIG. 3 is a flow diagram illustrating techniques according to an embodiment of the present invention. Step 302 includes determining a first object of interest within an image displayed on a screen, wherein said determining the first object of interest comprises detecting physical contact imparted by a user at a particular position on the screen corresponding to where the first object of interest is located. The first object of interest can include an item of apparel, an apparel accessory, etc. Additionally, the screen can include a mobile device screen, a desktop computer screen, etc. Further, the physical contact can include a touch by the user's finger and/or a touch by a pointing device.

Determining the first object of interest can include defining a Gaussian kernel centered on the particular position on the screen. Also, at least one embodiment of the invention can additionally include weighting feature representations from multiple positions on the screen based on the Gaussian kernel, as well as determining the feature representation for the particular position on the screen by summing the weighted feature representations from the multiple positions on the screen. Further, one or more embodiments of the invention can include increasing the width of the Gaussian kernel based on the quantified amount of pressure applied by the user via the physical contact.

Step 304 includes quantifying the amount of pressure applied by the user via the physical contact. Such a quantification step can be carried out based on a sensor reading. Step 306 includes determining one or more additional objects of interest within the image based on the amount of pressure applied by the user via the physical contact, wherein said determining the additional objects of interest comprises identifying one or more objects that are located within a specified distance from the first object of interest in the image, and wherein the specified distance corresponds to the amount of pressure applied by the user via the physical contact. The additional objects of interest can include one or more items of apparel, one or more apparel accessories, etc.

Step 308 includes retrieving, from at least one electronic commerce website, (i) one or more images of one or more products corresponding to the first object of interest and (ii) one or more images of one or more products corresponding to each of the one or more additional objects of interest. The electronic commerce website can include, for example, a fashion website and/or an apparel-selling website.

Step 310 includes displaying the retrieved images on the screen. Additionally, the image displayed on the screen can include an image derived from a source that is separate from the at least one electronic commerce website.

Also, an additional embodiment of the invention includes converting each of multiple images present in a product catalog of an electronic commerce website to a predetermined representation, and storing the converted images in an index. Additionally, such an embodiment can include determining a first object of interest within an image (i) derived from a social media post and (ii) displayed on a screen, wherein determining the first object of interest comprises detecting physical contact imparted by a user at a particular position on the screen corresponding to where the first object of interest is located. Such an embodiment can also include quantifying the amount of pressure applied by the user via the physical contact, and determining one or more additional objects of interest within the image based on the amount of pressure applied by the user via the physical contact, wherein determining the additional objects of interest comprises identifying one or more objects that are located within a specified distance from the first object of interest in the image, and wherein the specified distance corresponds to the amount of pressure applied by the user via the physical contact. Further, such an embodiment can include retrieving, from the index, (i) one or more images of one or more products corresponding to the first object of interest and (ii) one or more images of one or more products corresponding to each of the one or more additional objects of interest, and displaying the retrieved images on the screen.

At least one embodiment of the invention (such as the techniques depicted in FIG. 3, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives user-highlighted image information sent from a data source to the transmission server. The server can process the information, for example, based upon user-provided user preference information that is stored in memory on the server. Subsequently, an alert is generated containing related e-commerce product information. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
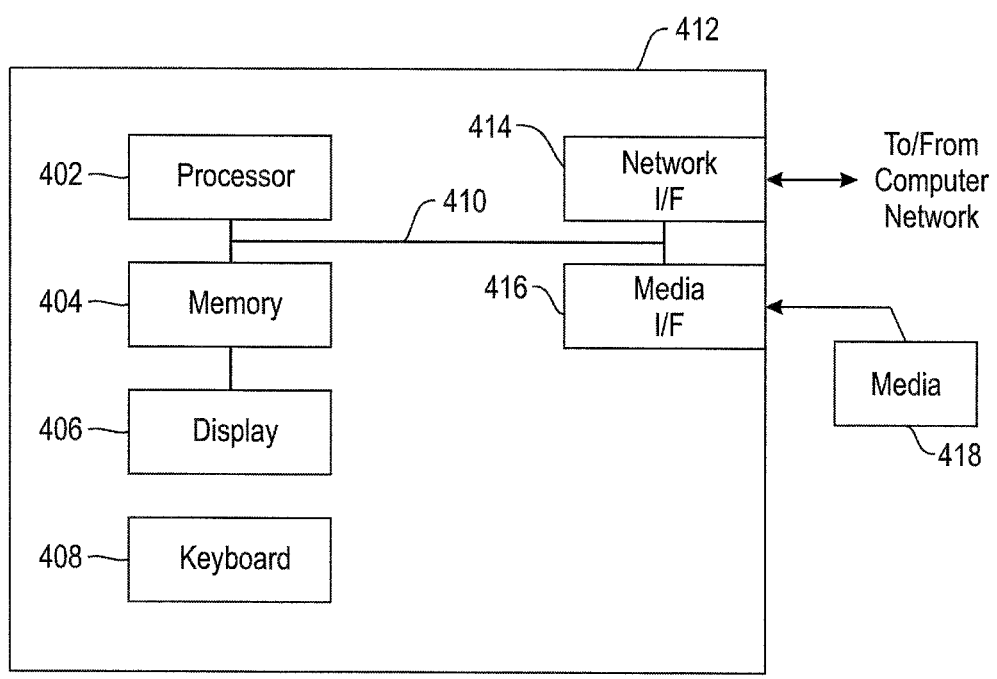
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
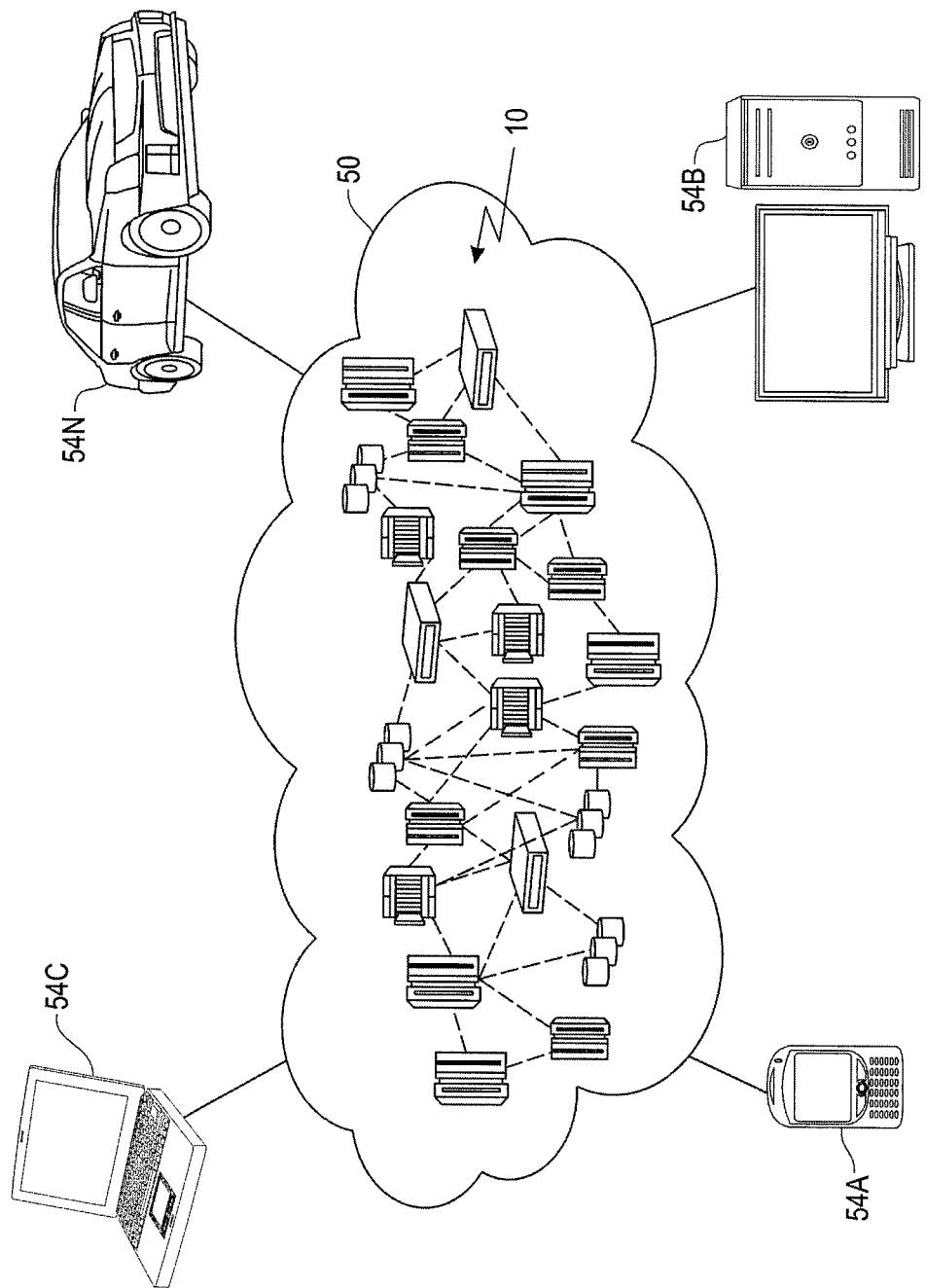
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
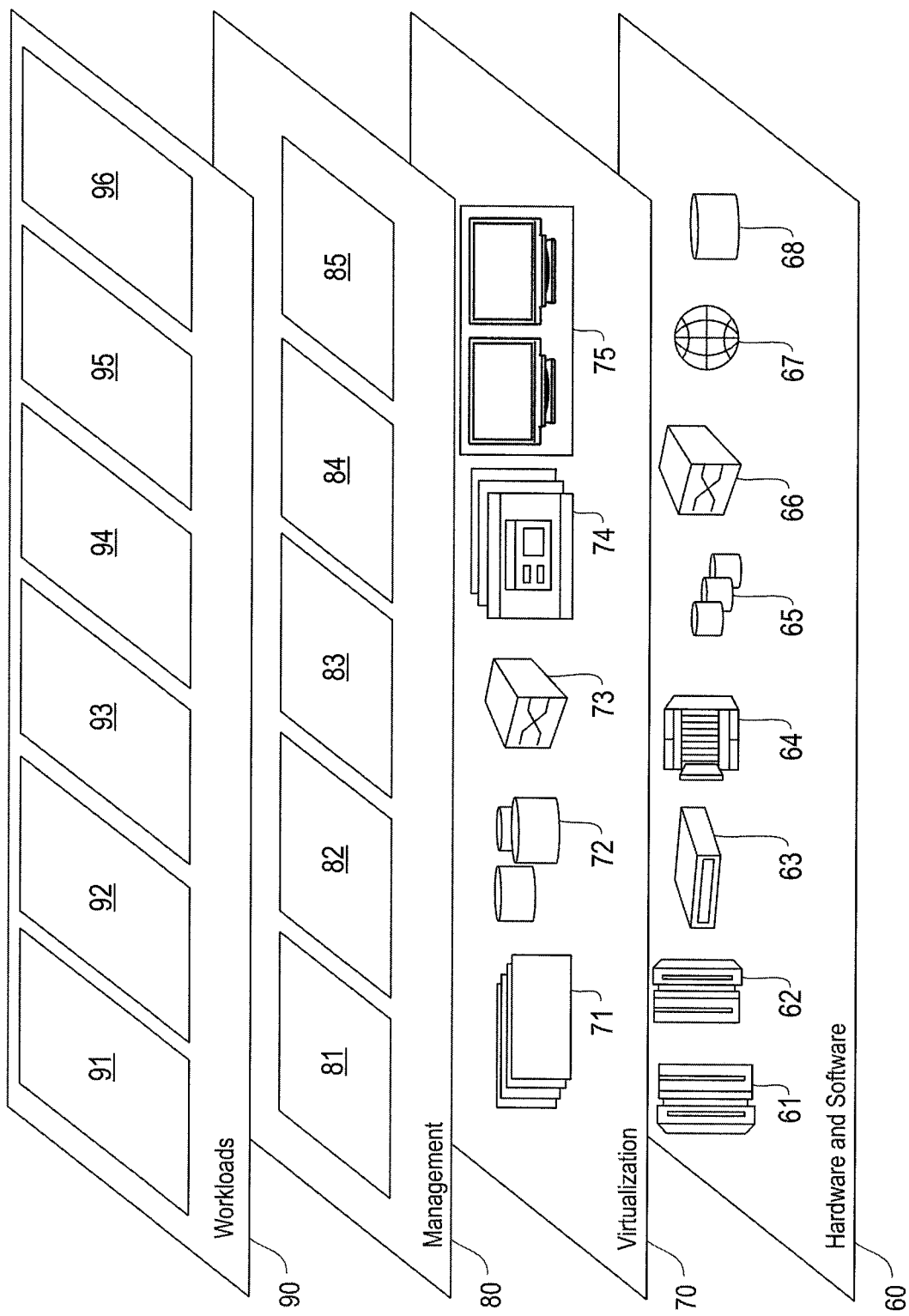
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image searching 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, projecting a touched area of a visual search to a convolution and/or pool layer below fully connected layers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    determining a first object of interest within an image displayed on a screen, wherein said determining the first object of interest comprises (i) detecting physical contact imparted by a user at a particular position on the screen corresponding to where the first object of interest is located, and (ii) defining a Gaussian kernel centered on the particular position on the screen, wherein defining the Gaussian kernel comprises increasing the width of the Gaussian kernel based on the quantified amount of pressure applied by the user via the physical contact;
    quantifying the amount of pressure applied by the user via the physical contact;
    determining one or more additional objects of interest within the image based on the amount of pressure applied by the user via the physical contact, wherein said determining the additional objects of interest comprises identifying one or more objects that are located within a specified distance from the first object of interest in the image, and wherein the specified distance corresponds to the amount of pressure applied by the user via the physical contact;
    retrieving, from at least one electronic commerce website, (i) one or more images of one or more products corresponding to the first object of interest and (ii) one or more images of one or more products corresponding to each of the one or more additional objects of interest; and
    displaying the retrieved images on the screen;
    wherein the method is carried out by at least one computing device.

2. The computer-implemented method of claim 1, wherein the first object of interest comprises an item of apparel.

3. The computer-implemented method of claim 1, wherein the first object of interest comprises an apparel accessory.

4. The computer-implemented method of claim 1, wherein the screen comprises a mobile device screen.

5. The computer-implemented method of claim 1, wherein the screen comprises a desktop computer screen.

6. The computer-implemented method of claim 1, wherein the physical contact comprises a touch by the user's finger.

7. The computer-implemented method of claim 1, wherein the physical contact comprises a touch by a pointing device.

8. The computer-implemented method of claim 1, comprising:
   weighting feature representations from multiple positions on the screen based on the Gaussian kernel.

9. The computer-implemented method of claim 8, comprising:
   determining the feature representation for the particular position on the screen by summing the weighted feature representations from the multiple positions on the screen.

10. The computer-implemented method of claim 1, wherein the one or more additional objects of interest comprise one or more items of apparel.

11. The computer-implemented method of claim 1, wherein the one or more additional objects of interest comprise one or more apparel accessories.

12. The computer-implemented method of claim 1, wherein the at least one electronic commerce website comprises an apparel-selling website.

13. The computer-implemented method of claim 1, wherein the image displayed on the screen comprises an image derived from a source that is separate from the at least one electronic commerce website.

14. A computer program product comprising a non-transitory computer readable storage medium having program instructions embodied therewith, the program instructions executable by a device to cause the device to:
   determine a first object of interest within an image displayed on a screen, wherein said determining the first object of interest comprises (i) detecting physical contact imparted by a user at a particular position on the screen corresponding to where the first object of interest is located, and (ii) defining a Gaussian kernel centered on the particular position on the screen, wherein defining the Gaussian kernel comprises increasing the width of the Gaussian kernel based on the quantified amount of pressure applied by the user via the physical contact;
   quantify an amount of pressure applied by the user via the physical contact;
   determine one or more additional objects of interest within the image based on the amount of pressure applied by the user via the physical contact, wherein said determining the additional objects of interest comprises identifying one or more objects that are located within a specified distance from the first object of interest in the image, and wherein the specified distance corresponds to the amount of pressure applied by the user via the physical contact;
   retrieve, from at least one electronic commerce website, (i) one or more images of one or more products corresponding to the first object of interest and (ii) one or more images of one or more products corresponding to each of the one or more additional objects of interest; and
   display the retrieved images on the screen.

15. The computer program product of claim 14, wherein said determining the first object of interest comprises defining a Gaussian kernel centered on the particular position on the screen.

16. The computer program product of claim 15, wherein the program instructions further cause the device to:
   weight feature representations from multiple positions on the screen based on the Gaussian kernel; and
   determine the feature representation for the particular position on the screen by summing the weighted feature representations from the multiple positions on the screen.

17. A system comprising:
a memory; and
at least one processor operably coupled to the memory and configured for:
   determining a first object of interest within an image displayed on a screen, wherein said determining the first object of interest comprises (i) detecting physical contact imparted by a user at a particular position on the screen corresponding to where the first object of interest is located, and (ii) defining a Gaussian kernel centered on the particular position on the screen, wherein defining the Gaussian kernel comprises increasing the width of the Gaussian kernel based on the quantified amount of pressure applied by the user via the physical contact;
   quantifying the amount of pressure applied by the user via the physical contact;
   determining one or more additional objects of interest within the image based on the amount of pressure applied by the user via the physical contact, wherein said determining the additional objects of interest comprises identifying one or more objects that are located within a specified distance from the first object of interest in the image, and wherein the specified distance corresponds to the amount of pressure applied by the user via the physical contact;
   retrieving, from at least one electronic commerce website, (i) one or more images of one or more products corresponding to the first object of interest and (ii) one or more images of one or more products corresponding to each of the one or more additional objects of interest; and
   displaying the retrieved images on the screen.

* * * * *